Figure 1A:
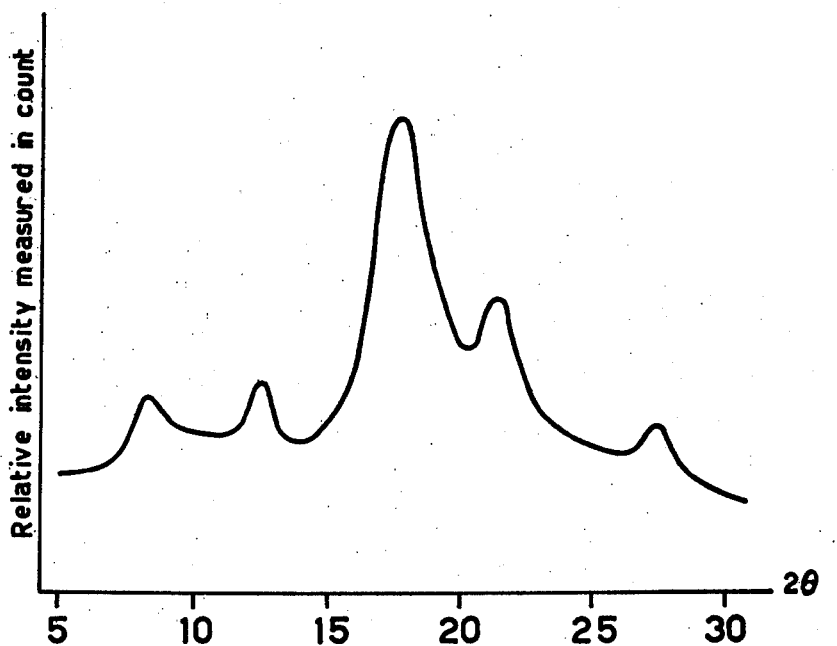

GIULIO NATTA
GIORGIO MAZZANTI
PAOLO LONGI
GINO DALL'ASTA
FRANCESCO BERNARDINI

INVENTORS

GIULIO NATTA
GIORGIO MAZZANTI
PAOLO LONGI
GINO DALL'ASTA
FRANCESCO BERNARDINI

INVENTORS 3,182,045
VINYLPYRIDINE POLYMERS HAVING A STERI-
CALLY REGULAR STRUCTURE AND PROCESS
FOR OBTAINING SAME
Giulio Natta, Giorgio Mazzanti, Paolo Longi, Gino
Dall'Asta, and Francesco Bernardini, all of Milan, Italy,
assignors to Montecatini, Società Generale per l'Industria Mineraria e Chimica, Milan, Italy, a corporation of Italy
Filed June 24, 1960, Ser. No. 38,580
Claims priority, application Italy, June 25, 1959, 10,764/59
20 Claims. (Cl. 260—88.3)

The present invention is directed to high molecular weight linear polymers, these polymers having a sterically regular structure of vinylpyridines or (nuclear-substituted) vinylpyridines substituted in the nucleus with alkyl radicals having up to 4 carbon atoms, and to the production thereof.

Amorphous polymers of vinylpyridines having an irregular structure are known. These polymers generally are obtained by polymerizing in the presence of radical generating catalysts. Such polymers do not possess the requisite mechanical properties to permit their use as plastic materials or as textile fibres. Moreover, these polymers easily absorb water, being thereby transformed into gummy products. As a means of improving the physical properties it has been proposed to copolymerize the vinylpyridines with monomers such as acrylonitrile, butadiene, styrene and the like, in the hope of obtaining products having different mechanical properties, dyeing characteristics, etc. However, heretofore vinylpyridine polymers having a particular sterically regular structure have not been disclosed.

Accordingly, it is an object of our invention to provide vinylpyridine polymers having a sterically regular structure and to provide a method of making such polymers.

Additional objects will become apparent hereinafter.

We have found that when a vinylpyridine is polymerized in the presence of a catalyst wherein the cation portion is a one or more metals selected from the group consisting of the metals in Groups I, II and III of the Periodic Table, and wherein the anion portion is selected from the group consisting of alkyl, aryl, hydride, alkylamine, arylamine, alkyl-halide, aryl-halide, mixed halide-alkylamine, mixed halide-arylamine and mixed halide-alkylarylamine, polymers can be obtained having a sterically regular structure and possessing new and superior characteristics.

We have therefore found a polymerization process by which it is possible to obtain novel polymers from nitrogen containing monomers, which polymers have a regular steric structure. These polymers present in the main chain a regular succession of tertiary carbon atoms having the same steric configuration. Such regular structure generally results in certain particular physical and mechanical characteristics, e.g., high melting point and low solubility in organic solvents. The greater the crystallinity due to this regular structure, the more pronounced are these properties.

Typical vinylpyridines from which polymers can be obtained having the above characteristics are 2-vinylpyridine, 3-vinylpyridine, 4-vinylpyridine, methyl-2-vinylpyridines, methyl-4-vinylpyridines, ethyl-2-vinylpyridines, particularly 5-ethyl-2-vinylpyridine, ethyl-4-vinylpyridines, etc.

Catalysts particularly suitable for polymerizing vinylpyridines according to our invention to produce polymers having a sterically regular structure include phenyl-magnesium bromide, diethyl-magnesium, butyl-magnesium chloride, diethyl-beryllium, magnesium-diethylamine bromide, magnesium-diethylamine chloride, magnesium-diethylamine jodide, beryllium-dimethylamine, magnesium-methylphenylamine bromide, aluminum-tris (dimethylamine) and aluminum-lithium hydride.

In addition, complexes containing bonds of the hydride type and bonds of the amine type can also be used as catalysts, such as for instance, amine-type compounds having the formula $LiAl[N(C_6H_5)_2]_3$ and $$\{Al[N(CH_3)_2]_3\}_2$$

The preparation of such compounds may be carried out as follows:

EXAMPLE A

Into a 1-liter flask provided with a mechanical agitator, reflux condenser, and funnel with stopcock, and maintained under nitrogen, are introduced 9 g. of $LiAlH_4$ (gas-volumetric titer 80%) in suspension in 150 ml. of anhydrous ether. From the funnel, a solution consisting of 170 g. of diphenylamine dissolved in 300 ml. of anhydrous ether is slowly dropped while agitating, in order to maintain a uniform and not excessive evolution of hydrogen.

The mixture is then heated to the ether boiling point and agitation is kept up for about 6 hours. The solid crystalline product thus formed is decanted, the major part of the upper limpid ether is removed, 3,200 ml. of benzene are added, and the mixture is heated and refluxed until the solid product is completely dissolved. The solution, after having been filtered on a porous glass filter under nitrogen and left standing for a few hours, yields big colorless crystals consisting of $$LiAl[N(C_6H_5)_2]_3H.O(C_2H_5)_2$$

In order to increase the yield of the crystalline product the mother solution is evaporated under reduced pressure until a small volume is obtained and this is again treated with 100 ml. of anhydrous ether. Another large quantity of crystals is thus separated, these crystals having the same composition and purity as those previously obtained. 84 g. of product are obtained cumulatively, the analysis of which is as follows:

Al=4.28% (theoretical for $$LiAl[N(C_6H_5)_2]_3H.O(C_2H_5)_2=4.395\%)$$

Li=1.15% (theoretical=1.13%)
N=6.82% (theoretical=6.85%)
H=(volumetric gas)=0.165% (theoretical=0.164%)

By heating to 150° C. under reduced pressure (about 1 mm. Hg) all of the ether present is removed, thus obtaining a compound having the following formula:

$$LiAl[N(C_6H_5)_2]_3H$$

EXAMPLE B

Into a 1-liter autoclave 42.5 of aluminum-tris (isobutyl), $Al(i-C_4H_9)_3$, dissolved in 70 ml. of n-heptane, are introduced under a nitrogen medium. Immediately after, there is cautiously added a solution of 60 g. of dimethylamine in 100 ml. of n-heptane. The autoclave is agitated and the temperature quickly raised to from about 190 to 200° C. After 15 hours the heating is interrupted.

All of the reaction product is poured out of the cooled autoclave, under a nitrogen medium, into a 500 ml. flask.

The amine introduced in excess and most of the n-heptane are then removed by distillation under reduced pressure and the residue is cooled to 0° C. The separate raw, colorless crystals have the following composition:

$$\{Al[N(CH_3)_2]_3\}_2$$

as shown by the following analytical data:

Al=16.58% (theoretical for $Al[N(CH_3)_2]_3$=16.94%)
N=26.15% (theoretical=26.40%)
Cryoscopic molecular weight=320.5 (theoretical molecular weight for $Al\{N(CH_3)_2\}_3$=159.2)

Preferably the catalysts are introduced in the form of solutions or suspensions in organic liquids. The liquid should preferably be anhydrous. Suitable liquids include benzene, toluene, etc.

The polymerization can be conveniently carried out at a temperature ranging from about −20 to +100° C., preferably from about +15 to +70° C. At lower temperatures the polymerization takes place at a reduced rate, but at higher temperatures the stereospecificity of the final product is reduced somewhat.

Our polymerization processes result in high yields. In relatively short times almost total conversions of the monomer are obtained at the temperatures indicated. The polymers produced by our process present a powdery appearance even in the initial raw state. When heated they are thermoplastic in their behavior, so that they can be molded by pressure die casting injection, or extrusion.

When 2-vinylpyridine is polymerized in accordance with our invention a highly crystalline polymer is obtained. It is not swollen by water. This polymer is insoluble in aliphatic hydrocarbons, in acetone, or in boiling methylethylketone, but it is soluble in boiling benzene, chloroform and pyridine.

Polymers obtained in the presence of a catalyst such as phenyl-magnesium bromide or magnesium diethylamine bromide are, after being boiled in acetone, highly crystalline as shown by X-ray analysis and present a spectrum of powders (CuK-alpha) having the most intense peaks for 2-theta angles equal to 8.15°; 12.45°; 17.1°; 18.0°, and 21.3°.

The molecular weight of the vinyl pyridine polymers can be varied within rather wide limits by merely varying the temperature of polymerization. This is shown hereinafter in Examples 1–3. In general, the higher the temperature of polymerization, the lower the molecular weight. The high molecular weight polymers can be extruded as filaments which, after a short treatment at a temperature from about 100 to 150° C. by X-ray analysis present the spectra of oriented fibres.

The spectrum examination of fibres so obtained from poly-2-vinylpyridine leads to the conclusion that the crystallinity is due to an isotactic structure and that the identity period along the chain axis is about 6.7 A.

A model illustrating isotactic type stereoregularity is given in U.S. Patent No. 3,112,300 issued to Natta et al. on November 26, 1963.

The textile fibres obtained from poly-2-vinylpyridine by extrusion from the molten mass and subsequent drawing, preferably carried out at temperatures greater than room temperature, have good mechanical properties. Further, owing to the presence of a nitrogen atom having basic characteristics in each monomeric unit, these fibres are easily dyeable with acid dyes.

The polymer of 4-vinylpyridine generally shows a lower crystallinity than that of 2-vinylpyridine polymers obtained under the same conditions.

Poly-4-vinylpyridine obtained by the process of our invention is virtually insoluble in boiling benzene and other aromatic hydrocarbons. This low solubility in such hydrocarbons proves that the macromolecules of the polymer have a regular structure in the main chain.

The temperature at which the crystallinity of the poly-2-vinylpyridine disappears ranges from about 170° to 215° C. The poly-4-vinylpyridine has a softening temperature at from about 190 to 200° C.

The following examples will further illustrate the invention. All parts are by weight unless otherwise indicated.

*Example 1*

Into a 250 ml. flask provided with an agitator, a funnel with stopcock, and a reflux condenser, and maintained under a dry nitrogen atmosphere, are introduced 100 ml. of deaerated anhydrous toluene and 1 g. of dry phenyl-magnesium bromide. 10 g. of 2-vinylpyridine, freshly distilled and kept away from air and moisture, are then poured into the closed drop funnel. The mixture contained in the flask is warmed up to 70° C. and the 2-vinylpyridine monomer is slowly added, while agitating the mixture. Agitation of the reaction mixture is continued for 5 hours at 70° C. The reaction is then interrupted by pouring 200 ml. of heptane into the mixture, thereby obtaining a white precipitate. The raw material is filtered and dissolved in 150 ml. of an I-Normal hydrochloric acid solution. The solution is filtered and neutralized by pouring it into ammonium chloride solution. The polymer, after being washed with water, is dissolved in 500 ml. of benzene. The benzene is then distilled until all of the water contained in the solution is removed. The polymer is then precipitated with heptane, filtered, and dried. The polymer is boiled for 2 hours in acetone. After cooling it is again filtered and dried. The polymer, which is now in the form of a white powder, is insoluble in water, alphatic hydrocarbons, acetone, and methylethylketone, but is soluble in methanol, benzene and chloroform. It is highly crystalline as shown by X-ray tests. The powder spectrum, recorded with a Phillips Norelco Geiger counter (CuK-alpha) (CuK alpha the characteristic of the anticathode i.e. characterizes the wave length of the X-ray employed) presents the most intense peaks for 2-theta angles, equal to 8.15°; 12.45°; 17.1; 18.0°; 21.9°.

The poly-2-vinylpyridine thus obtained has a net softening point at about 173° C. When molten it can be extruded as filaments which when treated at 150° C. in petroleum jelly such as sold under the trademark "Vaseline," crystallize and show, by X-ray tests, an oriented spectrum of fibres. The intrinsic viscosity, determined at 30° C. in benzene, is 0.15. The 2-vinylpyridine polymerization by the process of this example takes place with practically a total conversion of the monomer. The crystalline product, which is insoluble in acetone, represents from about 75 to 80% of the total polymer obtained.

*Example 2*

Another polymerization is carried out similar to that described in Example 1. However, the polymerization temperature is 40° C. instead of 70° C. The poly-2-vinylpyridine is purified as described in Example 1. 10 g. of polymer are obtained (100% conversion). This polymer is treated with boiling acetone. 90% of it (9 g.) are insoluble in the boiling acetone. This insoluble portion is crystalline, as in Example 1. The polymer is a very hard solid having properties analogous to those of the sample obtained in Example 1. However, its molecular weight is higher, its intrinsic viscosity, determined in benzene at 30° C. being 0.45. Owing to the higher molecular weight this sample is more suitable for spinning. The polymer may be treated at 150° C. with said petroleum jelly, whereby it becomes highly crystalline as shown by X-ray tests and powder spectrum measurements by means of a Geiger counter (CuK-alpha).

*Example 3*

A polymerization is carried out similar to that described in Example 1, but operating at a temperature of 15° C. instead of 70° C. The poly-2-vinylpyridine is purified as described in Example 1. The polymer is obtained in practically 100% conversion, the crystalline portion of which, insoluble in boiling acetone, represents about 85%. The crystallization of this polymer is facilitated by a thermal treatment with said petroleum jelly at 150° C.

The polymer thus obtained is a very hard crystalline solid crystalline at the X-ray test having properties analogous to those of the sample obtained in Example 2. The intrinsic viscosity of this polymer, determined in benzene at 30° C., is 0.75 (i.e., a molecular weight about 160,000).

Example 4

Into a 500 ml. capacity three-necked flask provided with an agitator and funnel with stopcock, are introduced under nitrogen 0.25 g. of Mg (C$_2$H$_5$)$_2$ with 250 ml. of anhydrous benzene. After a 5-minute agitation at room temperature, a solution of 15 g. of 2-vinylpyridine in 40 ml. of anhydrous benzene is introduced through the funnel. After about one minute, the monomer addition is completed and the temperature of the reaction mass is increased from 20° C. to about 30° C. Agitation is continued at room temperature for 3 hours and then all of the polymerization product is poured into concentrated hydrochloric acid with agitation until complete dissolution is obtained. This viscous solution, containing poly-2-vinylpyridine chlorohydrate, is diluted with about double its volume of water. The polyvinylpyridine is then regenerated by treating it with an ammonia solution of NH$_4$Cl. After filtration and drying 13.2 of polymer are obtained. This material is supended in n-decane at a temperature of 165° C. for a few hours and then is slowly cooled. The product thus obtained is highly crystalline as shown by X-ray tests carried out on the pulverulent polymer with a Geiger counter. The intrinsic viscosity, determnied in N,N-dimethylformamide at 30° C. is 0.61.

Example 5

0.5 g. of finely pulverized Mg[N(C$_2$H$_5$)$_2$]Br are introduced under a nitrogen medium along with 80 ml. of anhydrous toluene into a 350 ml. glass flask provided with an agitator and funnel with stopcock. The agitator is activated, the temperature is raised to 65° C., and a solution containing 10 g. of freshly distilled 2-vinylpyridine in 60 ml. of anhydrous toluene is slowly added. When the monomer addition lasting about 20 minutes is over, the mixture is agitated for an additional three and one-half hours and then 100 ml. of 5 N-hydrochloric acid are added, with agitation, until the polymerization mass completely dissolves. The polymer is subsequently regenerated by treating with ammonia and ammonium chloride-water solution. The white-flaked polymer is easily washed several times with water and is then dried by treatment with boiling benzene in order to remove the water-benzene azeotropic mixture.

The polymer is precipitated from the benzene solution with n-heptane, filtered and dried. By a protracted treatment of the polymer with acetone, a portion (0.8 g.) is dissolved. The larger insoluble portion, which consists of 8.2 g. of a solid powder product, is over 50% crystalline as shown by X-ray tests.

Figure 1B:
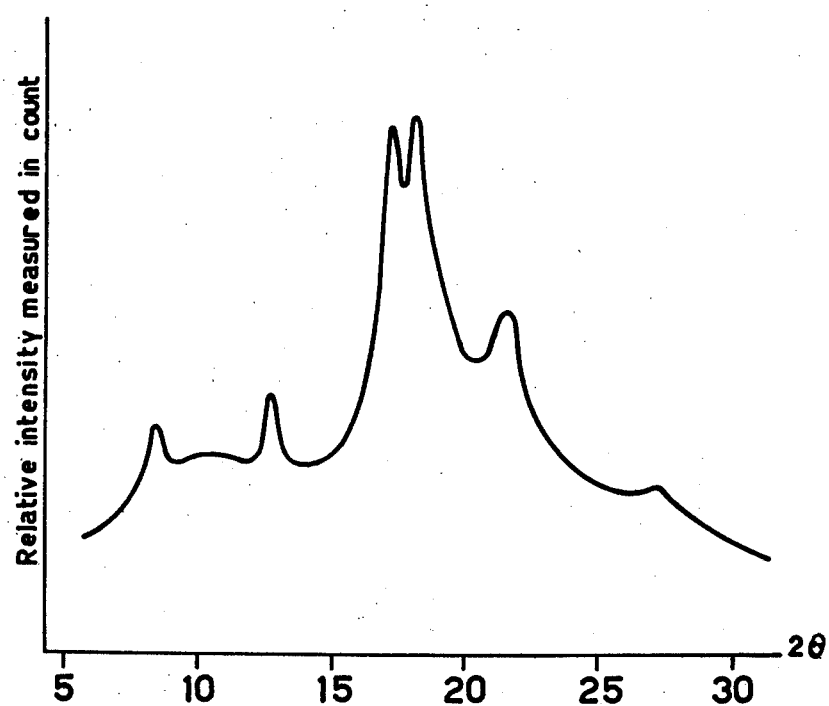

In the accompanying drawing, the X-ray diffraction pattern obtained by means of a Geiger counter (CuK-alpha) on the pulverulent polymer is shown in FIGURE 1A and after a few hours' treatment with decane at about 150° C. the polymer presents the diffraction spectrum shown in FIGURE 1B.

As will be noted from the figures, the more intense peaks are those for 2-theta angles equal to 8.15°; 12.45°; 17.1°; 18.0° and 21.3°. FIGURES A and B show the trend of the diffraction intensity at the X-ray test (CuK-alpha) recorded on a Geiger counter. On the ordinates the relative intensity measured in count is indicated, while on the abscissae the 2-theta diffraction angles are shown. This crystalline polymer is insoluble in aliphatic hydrocarbons, in ethyl or isopropyl ether, in acetone, or in methylethyl ketone (each used at its boiling temperature). In capillary, the polymer presents a softening temperature of about 170° C. to 180° C. The melting point, determined by means of a polarizing microscope, is about 177° C.

Example 6

By carrying out the polymerization of 2-vinylpyridine as described in Example 3 but using 220 ml. instead of 100 ml. anhydrous toluene, 30 g. instead of 10 g. 2-vinylpyridine and 0.7 g. instead of 1 g. dry phenylmagnesium bromide and purifying the poly-2-vinylpyridine thus obtained as described in Example 1, a polymer whose crystalline portion insoluble in boiling acetone, corresponds to 96%, is obtained with a conversion of about 100%.

The crystallization of this polymer is favoured by a thermal treatment at 150° C. The polymer thus obtained is a very hard solid, crystalline by means of X-ray test, presenting properties similar to those of the sample obtained in Example 3.

Example 7

By carrying out the polymerization of 2-vinylpyridine as described in Example 2 by using 0.5 g. instead of 1 g. phenylmagnesium bromide and purifying then the poly-2-vinylpyridine thus obtained as described in Example 1, a polymer whose crystalline portion insoluble in boiling acetone, corresponds to 87%, is obtained with a conversion of about 100%.

The polymer thus obtained, which appears to be crystalline by means of X-ray tests, presents properties similar to those of the sample obtained in Example 2. The intrinsic viscosity, determined in N,N-dimethylformamide at 30° C., is 0.49. Its melting point, determined with a polarized light microscope is 211.5° C.

Example 8

By carrying out the polymerization of 2-vinylpyridine as described in Example 2 but using 0.2 g. tert. butyl magnesium chloride instead of 1 g. phenyl magnesium bromide and purifying afterwards the poly-2-vinylpyridine obtained as described in Example 1, a polymer, completely insoluble in boiling acetone is obtained with a conversion of 45%. The polymer thus obtained appears to be crystalline by means of X-ray tests and presents properties similar to those obtained in Example 2.

Example 9

By carrying out the polymerization of 2-vinylpyridine as described in Example 2 but using 100 ml. anhydrous chloro-benzene instead of toluene and purifying the poly-2-vinylpyridine obtained as described in Example 1, a polymer whose crystalline portion insoluble in boiling acetone amounts to 85% referred to the monomer used, is obtained with a conversion higher than 90%.

The polymer thus obtained, which appears to be crystalline by means of X-ray tests, presents properties similar to those of the sample obtained in Example 2. Its intrinsic viscosity, determined in N,N-dimethylformamide at 30° C. is 0.44.

Example 10

By carrying out the polymerization of 2-vinylpyridine as described in Example 2 but using 100 ml. anhydrous chloropentane instead of toluene and then purifying as described in Example 1 the poly-2-vinylpyridine obtained, a polymer, whose crystalline portion insoluble in boiling acetone corresponds to 37% referred to the monomer used, is obtained with a conversion of 43%.

The polymer thus obtained appears to be crystalline by means of X-ray tests and presents properties similar to those of the sample obtained in Example 2. Its intrinsic viscosity, determined in N,N-dimethylformamide at 30° C., is 0.57.

Example 11

15 g. 2-vinylpyridine, dissolved in 100 ml. of toluene, are polymerized in the presence of 0.2 g. of Be[N(CH$_3$)$_2$]$_2$ at the temperature of 45° C.

After 3 hours the polymer obtained is isolated according to the method described in Example 1.

14 g. poly-2-vinylpyridine, which appear to be crystalline by means of X-ray tests, are obtained. This crystallinity however is lower than that of the polymers obtained with Mg[N(C$_2$H$_5$)$_2$]Br. The intrinsic viscosity of the polymer determined in N,N-dimethylformamide at 30° C., is 0.45.

Example 12

5 g. of 2-vinylpyridine are polymerized, as described in the previous examples, but in the presence of 0.4 g. Mg[N(CH$_3$)(C$_6$H$_5$)]Br.

The polymer obtained appears by means of X-ray tests to be highly crystalline and presents an intrinsic viscosity determined in N,N-dimethylformamide at 30° C. of 0.6. By infrared spectrographic examination methylphenylamino groups as terminal groups are clearly observed.

Example 13

By polymerising as described in Example 5 but in the presence of Mg[N(C$_2$H$_5$)$_2$]Cl or Mg[N(C$_2$H$_5$)$_2$]I instead of Mg[N(C$_2$H$_5$)$_2$]Br. In both cases the monomer conversion and the crystallinity are practically the same as those of the polymer obtained with

Mg[N(C$_2$H$_5$)$_2$]Br

The intrinsic viscosities are on the contrary 0.17 and 0.26 for the polymers obtained respectively with

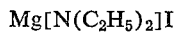
Mg[N(C$_2$H$_5$)$_2$]I and Mg[N(C$_2$H$_5$)$_2$]Cl.

Example 14

The polymerisation of 2-vinylpyridine is carried out in a manner analogous to that described in Example 1, but using as catalyst 0.3 g. of aluminium lithium hydride instead of 1 g. of phenyl-magnesium bromide, a poly-2-vinylpyridine in the form of a white powder is obtained. X-ray tests of this polymer show a rather low crystallinity and reflections, recorded with the Geiger counter analogous to those of the poly-2-vinylpyridines obtained in the previous examples. The physical properties of this polymer are also similar to those of the poly-2-vinylpyridines of the other examples. The amount of polymer obtained (prior to treatment in acetone) corresponds to 100% conversion. By protracted boiling in acetone, a pulverulent precipitate is obtained, corresponding to 83% of the total polymer produced. This fraction, insoluble in acetone is crystalline as shown by X-ray tests.

Example 15

10 g. of 2-vinylpyridine are polymerized as described in Example 5, but using a catalyst of Al[N(CH$_3$)$_2$]$_3$ instead of Mg[N(C$_2$H$_5$)$_2$]Br.

The temperature of the polymerization is 80° C. and 0.4 g. Al[N(CH$_3$)$_2$]$_3$ are used as the catalyst dissolved in 140 ml. of anhydrous toluene. After 6 hours the polymerization product is treated and dissolved with dilute HCl. The polymer is then reprecipitated with a 20% KOH solution. The polymer obtained is completely soluble in boiling acetone and X-ray tests show a high crystallinity.

Example 16

Proceeding as in Example 5, but using as a catalyst 0.5 g. of LiAl[N(C$_6$H$_5$)$_2$]$_3$H, 8.7 g. of poly-2-vinylpyridine are obtained. After treatments analogous to those described in Example 5 are completed, a white powder insoluble in boiling acetone is obtained in an amount corresponding to about 80% of the total polymer produced. X-ray tests on this polymer show it to be highly crystalline and to have properties analogous to those of the crystalline poly-2-vinylpyridines obtained in the previous examples.

Example 17

0.6 g. of Mg(C$_2$H$_5$)$_2$ and 120 ml. of anhydrous benzene are introduced (under a nitrogen medium) into a 500 ml. glass flask provided with an agitator and a funnel with a stopcock. The mixture is heated up to 70° C. and a solution of 15 g. of freshly distilled 4-vinylpyridine in 100 ml. of benzene is slowly added. The monomer addition is completed in about half an hour. The mixture is agitated at 70° C. for an additional two hours. All of the polymerization product is then poured into a solution containing 60 ml. or 36% HCl (10 N solution) in 300 ml. of water and is agitated until the polymer dissolves completely. The upper benzenic phase is then separated with a separatory funnel. The aqueous phase is slowly added, with vigorous agitation, to an ammonia solution of ammonium chloride. A flocky polymer separates out after being left to stand for a short time. It is filtered and then dehydrated by treatment with chloroform and subsequent removal of the water-chloroform azeotropic mixture. The polymer is precipitated from the chloroform solution with n-heptane, and is filtered and dried. 13 g. of a pulverulent polymeric product, insoluble in boiling benzene, are thus obtained. A sample kept for one hour at 170° C. under nitrogen medium and then slowly cooled shows, by means of X-ray tests, the presence of weak crystallinity. The polymer begins to soften at 195 to 200° C., and has an intrinsic viscosity, determined in N,N-dimethylformamide at 30° C., of about 0.45.

Example 18

0.3 g. of Be(C$_2$H$_5$)$_2$ dissolved in 100 ml. of anhydrous toluene are introduced under nitrogen into a 300 ml. glass flask provided with an agitator and a funnel provided with a stopcock. After starting the agitation, the mixture is heated up to 93° C. and a solution of 10 g. of freshly distilled 4-vinylpyridine in 80 ml. of toluene is added dropwise. After about 30 minutes the monomer addition is completed. The agitation is continued for 2 hours at 93° C. The polymer subsequently is isolated and purified as described in Example 17. 9.2 g. of a white, pulverulent polymer are obtained. This polymer is insoluble in benzene or other aromatic hydrocarbons, in contrast to the crystalline polymer of 2-vinylpyridine. A sample of this polymer is maintained at 170° C. for 2 hours and is then slowly cooled. X-ray tests show a weak crystallinity, carried out on the powdered product with a Geiger counter. A sample of polymer, when heated to 190–200° C. for several hours under nitrogen, does not become yellow. The intrinsic viscosity, measured in N,N-dimethylformamide at 30° C. is 0.76.

Example 19

Using an apparatus similar to that described in Example 1, 0.25 g. of Mg[N(C$_2$H$_5$)$_2$]Br in 35 ml. anhydrous toluene are introduced under nitrogen. A solution of 10 g. of 5-ethyl-2-vinylpyridine in 35 ml. toluene are then slowly added at 25° C. while agitating. After 2 hours' polymerisation the polymer is isolated as described in Example 1.

8.4 g. white powdery product having an intrinsic viscosity determined in N,N-dimethylformamide at 30° C., of 0.15, are obtained.

Variations can, of course, be made without departing from the spirit of our invention.

Having thus described our invention, what we desire to secure and claim by Letters Patent is:

1. A high molecular weight, highly-crystalline linear homopoylmer of vinyl pyridine having an isotactic structure prevailing in the macromolecules.

2. The polymer of claim 1 further characterized in that the vinyl pyridine is substituted in the nucleus with alkyl radicals having up to 4 carbon atoms.

3. The polymer of claim 1 further characterized in that the vinyl pyridine is 2-vinyl pyridine.

4. The polymer of claim 1 further characterized in that the vinyl pyridine is 3-vinyl pyridine.

5. The polymer of claim 1 further characterized in that the vinyl pyridine is 4-vinyl pyridine.

6. The polymer of claim 1 further characterized in that the vinyl pyridine is 5-ethyl-2-vinyl pyridine.

7. The polymer of claim 3 further characterized as being a highly crystalline thermoplastic polymer.

8. The polymer of claim 1 further characterized in that the polymer has a melting point above 170° C. and is insoluble in boiling aliphatic hydrocarbons, acetone, and methyl ethyl ketone.

9. The polymer of claim 7 further characterized in that the crystalline thermoplastic polymer is in the form of fibers.

10. A method of polymerizing vinyl pyridine to a high molecular weight highly crystalline linear homopolymer containing macromolecules having an isotactic sterically-regular structure which comprises polymerizing said vinyl pyridine in the presence of an effective amount of a catalyst at a temperature ranging from about −20 to +100° C.; said catalyst consisting essentially of a cation selected from at least one of the metals of Groups I, II, and III of Mendeléeff's Periodic Table and an anion selected from the group consisting of alkyl radicals, aryl radicals, hydrides, alkyl amine radicals, aryl amine radicals, alkyl halides, aryl halides, mixtures of halides and alkyl amine radicals, mixtures of halides and aryl amine radicals, and mixtures of halides and alkyl aryl amine radicals.

11. The method of claim 10 further characterized in that the pyridine is a nuclear-substituting vinyl pyridine, wherein the substituent is an alkyl radical having up to 4 carbon atoms.

12. The method of claim 10 further characterized in that the cation of the catalyst is magnesium.

13. The method of claim 10 further characterized in that the cation of the catalyst is beryllium.

14. The method of claim 10 further characterized in that the anion is a hydride.

15. The method of claim 10 further characterized in that the catalyst is phenyl magnesium bromide.

16. The method of claim 10 further characterized in that the catalyst is diethyl magnesium.

17. The method of claim 10 further characterized in that the catalyst is butyl magnesium chloride.

18. The method of claim 10 further characterized in that the catalyst is diethylamine magnesium chloride.

19. The method of claim 10 further characterized in that the catalyst is phenylmethylamine magnesium bromide.

20. The method of claim 10 further characterized in that the catalyst is aluminum dimethylamine.

References Cited by the Examiner

UNITED STATES PATENTS

| | | | |
|---|---|---|---|
| 2,715,118 | 8/55 | Grim et al. | 260—88.3 |
| 2,846,427 | 8/58 | Findlay. | |
| 3,024,225 | 3/62 | Teot | 260—88.3 |

FOREIGN PATENTS

| | | |
|---|---|---|
| 849,126 | 1/39 | France. |

OTHER REFERENCES

Bovey et al.: Journal of Polymer Science, vol. 44, pages 173–182 (1960).

Gaylord et al.: Linear and Stereoregular Addition Polymers (1959), page 126.

Frank et al.: Journal American Chem. Soc., vol. 68, p. 908 (1946).

Miller, Chem. and Ind., vol. 41, 1323, October 1958.

Landler: Recueil des Travaux Chimeques des Pays, Bas, vol. 68, pp. 992–998 (1949).

Golding: Polymers and Resins (pages 22 and 548–550), D. Van Nostrand (1959).

Flory: Principles of Polymer Chemistry (page 237), Cornell (1959).

Fuoss et al.: Journal of Polymer Science, vol. 3, page 247 (1948).

Maclay et al.: Journal of Polymer Science, vol. 6, page 511 (1951).

Strauss et al.: Journal of Polymer Science, vol. 9, page 510 (1952).

Miller et al.: Journal of Polymer Science, vol. 44, pages 391–395 (1960).

Miller et al.: Journal of Polymer Science, vol. 55, pages 643–656 (1961).

Schildknecht: Industrial & Engineering Chemistry, vol. 41, pages 1998–2003 (1949).

WILLIAM H. SHORT, *Primary Examiner.*

MILTON STERMAN, H. N. BURSTEIN, J. R. LIBERMAN, *Examiners.*